United States Patent
Duan

(10) Patent No.: US 7,889,650 B2
(45) Date of Patent: Feb. 15, 2011

(54) METHOD FOR ESTABLISHING DIAMETER SESSION FOR PACKET FLOW BASED CHARGING

(75) Inventor: Xiaoqin Duan, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 467 days.

(21) Appl. No.: 11/702,520

(22) Filed: Feb. 6, 2007

(65) Prior Publication Data
US 2007/0189297 A1   Aug. 16, 2007

Related U.S. Application Data

(63) Continuation of application No. PCT/CN2005/001237, filed on Aug. 11, 2005.

(30) Foreign Application Priority Data
Aug. 11, 2004   (CN) .................. 2004 1 0056106

(51) Int. Cl.
*H04M 11/00* (2006.01)
(52) U.S. Cl. .................. 370/230; 370/229; 455/403; 455/405; 455/406; 455/407; 455/408
(58) Field of Classification Search ................ 370/229, 370/230; 455/403, 405–408
See application file for complete search history.

(56) References Cited

U.S. PATENT DOCUMENTS

| 6,834,300 | B1 | 12/2004 | Barna et al. |
| 6,975,850 | B1 | 12/2005 | Hurtta et al. |
| 2001/0005675 | A1* | 6/2001 | Aho ............................ 455/412 |
| 2002/0068545 | A1* | 6/2002 | Oyama et al. ................ 455/406 |
| 2003/0152039 | A1 | 8/2003 | Roberts |

(Continued)

FOREIGN PATENT DOCUMENTS

CN   1459185 A   11/2003

(Continued)

OTHER PUBLICATIONS

Universal Mobile Telecommunications Systems, ETSI Standards, European Telecommunications Standards Institute, Sophia-Antipo, FR, vol. 3-CN3; 3-CT3, No. V600, Dec. 24, XP014027916 ISSN: 0000-0001 claims 1-6.

(Continued)

*Primary Examiner*—William Trost, IV
*Assistant Examiner*—Charles C Jiang
(74) *Attorney, Agent, or Firm*—Slater & Matsil, L.L.P.

(57) ABSTRACT

A method for establishing a Diameter session for packet flow based charging with multiple ways for establishing the Diameter session between a TPF and a CRF. The Diameter session can be established for each bearer of each subscriber, which means that for GPRS the Diameter session is established for each PDP Context State Model of each subscriber. The Diameter session can also be established for the bearers with a same APN of each subscriber. The Diameter session can further be established for all the bearers of each subscriber. The invention improves the mechanism for establishing Diameter sessions and makes the implementation of the charging flow more integrated. Moreover, the multiple ways for establishing Diameter sessions between the TPF and the CRF provided in the present invention can be flexibly selected according to the practical charging applications.

18 Claims, 7 Drawing Sheets

U.S. PATENT DOCUMENTS

2004/0028055 A1* 2/2004 Madour et al. ......... 370/395.21
2004/0048599 A1   3/2004 Kotaluoto et al.
2008/0311883 A1* 12/2008 Bellora et al. ............... 455/406

FOREIGN PATENT DOCUMENTS

| CN | 1507200 | 6/2004 |
|---|---|---|
| KR | 2004064081 | 7/2004 |
| WO | WO 01/39483 A2 | 5/2001 |
| WO | WO 01/67706 A2 | 9/2001 |
| WO | WO 01/91446 A2 | 11/2001 |
| WO | WO 02/37870 A | 5/2002 |
| WO | WO 02/101624 A1 | 12/2002 |

OTHER PUBLICATIONS

Jarkko Ansamaa: "Charging rule provisioning over Gx interface" 3GPP TS 29.910 VO.4.9 (May 2004), [Online] May 24, 2004, pp. 1-27, XP002455193; retrieved from the Internet: URL:http://list.etsi.org/scripts/wa.exe?A2=ind0405&I=3GPP-TSG-Cn-WG3&P=R42424&I=-3. [retrieved on Oct. 16, 2007) claims 1, 2-6.

Mark Grayson CISCO Systems: "Diameter NASREQ Extensions for the Delivery of Service-Flow Charging Rules" IETF Standard-Working-Draft, Internet Engineering Task Force, IETF, CH, Jun. 2003, XP015001035, ISSN 0000-0004 claims 1-6.

Calhoun Airespace P et al: "Diameter Base Protocol" IETF Standard, Internet Engineering Task Force, IETF, CH, Sep. 2003 (Sep. 2003); XP015009370 ISSN: 0000-0003 claims 1-6.

International Preliminary Report on Patentability, International application No. PCT/CN2005/001237, date of issuance of this report Feb. 13, 2007, 4 pages.

Communication pursuant to Article 94(3) EPC, Application No. 05 780 653.1-2416, May 20, 2008, 7 pages.

Communication pursuant to Article 94(3) EPC, Application No. 05 780 653.1-2416, Nov. 19, 2008, 4 pages.

Extended European Search Report, Application No. 09178011.4-2416, Jan. 27, 2010, 8 pages.

3GPP TSG-SA WG2 Meeting #35, Ericsson, "Gx Functions for Flow Based Charging," Bangkok, Thailand, Oct. 27-31, 2003, 4 pages.

3GPP TS 23.125 V6.0.0 (Mar. 2004), "$3^{rd}$ Generation Partnership Project; Technical Specification Group Services and System Aspects; Overall High Level Functionality and Architecture Impacts of Flow Based Charging; Stage 2 (Release 6)," Mar. 2004, 30 pages.

3GPP TS 23.125 V6.1.0 (Jun. 2004), "$3^{rd}$ Generation Partnership Project; Technical Specification Group Services and System Aspects; Overall High Level Functionality and Architecture Impacts of Flow Based Charging; Stage 2 (Release 6)," Jun. 2004, 41 pages.

English translation of Chinese office action dated Sep. 22, 2006, 200410056106X, 8 pages.

* cited by examiner

METHOD FOR ESTABLISHING DIAMETER SESSION FOR PACKET FLOW BASED CHARGING

CROSS-REFERENCE TO RELATED APPLICATIONS

This is a continuation of International Application No. PCT/CN2005/001237, filed on Aug. 11, 2005, now published as WO 2006/015547, published date Feb. 16, 2006, which designated the United States; the disclosure of which is hereby incorporated by reference in its entirety.

FIELD OF THE INVENTION

The present invention relates to the field of packet flow based charging in general, and more particularly, to a method for establishing a Diameter session for packet flow based charging.

BACKGROUND OF THE INVENTION

Along with the wide applications of packet data services, how to accurately and reasonably perform charging to the packet data services has been a problem concerned by operators.

FIG. 1 illustrates a process of performing activation, data transfer and deactivation of a Packet Data Protocol Context (PDP Context). As shown in FIG. 1, in a General Packet Radio Service (GPRS) system, the process of activating the PDP Context, performing data interaction with external Packet Data Network (PDN) and deactivating the PDP Context includes the following steps.

Step 101: A Mobile Station (MS) transmits an Activate PDP Context Request to a Serving GPRS Support Node (SGSN). The Activate PDP Context Request carries the information such as a Network Layer Service Access Point Identifier (NSAPI), a PDP type, an Access Point Name (APN), a demanded Quality of Service (QoS) parameter and a Transaction Identifier (TI). The NSAPI is a component part of a Tunnel Identifier (TID) for identifying the PDP Context between the SGSN and a Gateway GPRS Support Node (GGSN). The PDP type includes a Peer-Peer Protocol (PPP) type, an Internet Protocol (IP) type, etc. The APN can be provided by the MS to the SGSN, the SGSN addresses the corresponding GGSN according to the APN, and the GGSN determines the external network that the MS is to access according to the APN; the MS also may not provide the SGSN with the APN, and the SGSN selects a default APN according to the subscription information of the MS subscriber. The QoS parameter refers to the quality demand, which the packet data service needs to achieve, appointed by the MS. The TI is used by the MS for identifying a certain PDP Context.

Step 102: On receiving the Activate PDP Context Request, the SGSN and the MS perform security checks and encryption. This step is optional.

Step 103: The SGSN resolves address information of the GGSN according to the APN. If the SGSN can resolve the address information of the GGSN according to the APN, the SGSN creates a TEID for the PDP Context; the TEID can be a combination of an International Mobile Subscriber Identity (IMSI) and the NSAPI. And the SGSN transmits a Create PDP Context Request to the GGSN; the Create PDP Context Request carries the PDP type, a PDP address, the APN, the QoS parameters, the TEID, a selection mode and so on. The PDP address can be the IP address of the MS. The PDP address is an optional parameter and may not be carried in the Create PDP Context Request, under which condition, in the subsequent processing steps, the IP addresses can be allocated to the MS by the GGSN or the PDN which finally establishes a connection with the MS. The selection mode refers to the selection mode of the APN, i.e. whether the APN is selected by the MS or the SGSN. If the SGSN cannot resolve the address information of the GGSN according to the APN, the SGSN will reject the Active PDP Context Request initiated by the MS.

Step 104: On receiving the Create PDP Context Request, the GGSN determines the exterior PDN according to the APN, allocates a Charging ID, and starts up the charging process and a QoS negotiation. If the GGSN can meet the QoS demand of the QoS parameter, it will returns to the SGSN a Create PDP Context Response, which carries the information such as the TEID, the PDP address, a Backbone Bearer Protocol, a negotiated QoS parameter and the Charging ID. If the GGSN cannot meet the QoS demand of the QoS parameter, the GGSN will reject the Create PDP Context Request initiated by the SGSN, and then the SGSN will reject the Activate PSP Context Request initiated by the MS.

Step 105: On receiving the Create PDP Context Response, the SGSN inserts the NSAPI and the GGSN address information to identify the PDP Context, selects a radio priority according to the negotiated QoS parameter, and returns an Activate PDP Context Accept to the MS. The Activate PDP Context Accept carries the information such as the PDP type, the PDP address, the TI, the negotiated QoS parameter, the radio priority, PDP configuration options, etc. The SGSN starts up the charging process. The MS establishes a direct routing between the MS and the GGSN after receiving the Activate PDP Context Accept, and the packet data transfer can be performed.

Step 106: The MS performs packet data interaction with the PDN through the SGSN and GGSN.

Step 107: After the packet data interaction, the MS transmits to the SGSN a Deactivate PDP Context Request, which carries the TI.

Step 108: On receiving the Deactivate PDP Context Request, the SGSN performs the security checks and the encryption to the MS. This step is optional.

Step 109-111: The SGSN transmits to the GGSN a Delete PDP Context Request, which carries the TEID. On receiving the Delete PDP Context Request, the GGSN ends the charging process to the MS, deletes the PDP Context corresponding to the TEID, and transmits to the SGSN a Delete PDP Context Response, which carries the TEID. On receiving the Delete PDP Context Response, the SGSN ends the charging process to the MS, deletes the PDP Context corresponding to the TEID, and transmits to the MS a Deactivate PDP Context Response, which carries the TI. On receiving the Deactivate PDP Context Response, the MS deletes the PDP Context corresponding to the TI.

It can be seen from the implementation process described in FIG. 1 that, in the prior GPRS charging system, since the starting point of the charging is set at the moment when the PDP Context is activated, and the ending point of the charging is set at the moment when the PDP Context is deleted, the charging process is performed only according to the data traffic transmitted by the PDP Context, or according to the time span that the PDP Context is in the activation state. However, in practical applications, after the MS and the PDN perform the data interaction, the MS can perform multiple services based on one activated PDP Context. In other words, if the PDN can provide multiple services such as an Email service, a browsing service based on the Wireless Application Protocol (WAP), a file transfer service based on the File Transfer Protocol (FTP) and so on, after the MS and the PDN establish a transfer channel, various services provided by the PDN can be born through one activated PDP Context. However, it is possible that the operators employ different charging methods for different services. For example, for the Email service, the charging can be performed according to times of receiving/sending the Emails; for the WAP browsing service, the charging can be performed according to the traffic; and for the FTP service, the charging also can be performed according to the traffic, but the charging rate of the WAP browsing service is not completely same as the charging rate of the FTP service. In this way, according to the prior GPRS system, the differentiated charging can not be performed to different services born by the same PDP Context at all.

In view of the above, at present, the 3rd Generation Partnership Project (3GPP) is discussing how to realize an IP Flow Based Charging (FBC). For a packet data service, when the subscriber of the MS uses the service, all the transmitted and received IP Flows, or the IP packets, are called a Service Data Flow. In other words, the Service Data Flow is an aggregate composed of multiple IP Flows, so the IP flow based charging can truly reflect the occupation status of the resources by a certain Service Data Flow. The IP Flow based charging can be regarded as the process of respectively filtering the IP Flows of different services born in the same PDP Context through some filters similar to sieves and respectively performing charging to the IP Flows filtered by the different filters, so as to achieve the object of respectively performing charging to the data flows of different services. In this way, the charging granularity according to the IP flow based charging is far smaller than the charging granularity according to the PDP Context based charging. The granularity can be regarded as the size of the sieve apertures; the charging granularity according to the PDP Context based charging is: one PDP Context is one sieve aperture; while the charging granularity according to the IP flow based charging is: one IP Flow is one sieve aperture, i.e. one PDP Context includes multiple sieve apertures. Comparing the charging according to the PDP Context based charging, the charging according to the IP Flow based charging can provide more abundant charging modes for the operators or the service providers.

The system structure, the function demands and the message interaction flow of the FBC are described in 3GPP. A system structure of the FBC supporting online charging is shown in FIG. 2A. Service Control Point (SCP) 201 of Customized Application for Mobile Network Enhanced Logic (CAMEL) and Service Data Flow Based Credit Control Function (CCF) 202 compose Online Charging System (OCS) 206. CCF 202 intercommunicates with Service Data Flow Based Charging Rule Function (CRF) 203 through an Ry interface, CRF 203 intercommunicates with Application Function (AF) 204 through an Rx interface, CRF 203 intercommunicates with Traffic Plane Function (TPF) 205 through a Gx interface, and CCF 202 intercommunicates with TPF 205 through a Gy interface.

A system structure of the FBC supporting offline charging is shown in FIG. 2B. CRF 203 intercommunicates with AF 204 through a Rx interface, CRF 203 intercommunicates with TPF 205 through a Gx interface, and TFP 205 respectively intercommunicates with Charging Gateway Function (CGF) 207 and Charging Collection Function (CCF) 208 through a Gz interface.

TPF 205 bears the IP Flows. When the bearer of the IP Flows is established, TPF 205 transmits a Request Charging Rules to CRF 203 through the Gx interface, and the Request Charging Rules carries information relevant to the subscriber and the MS, bearer characteristics and information relevant to the network. The information relevant to the subscriber and the MS can be a Mobile Station International ISDN (MSISDN) Number or an International Mobile Subscriber Identifier (IMSI) etc; the information relevant to the network can be a Mobile Network Code (MNC) or a Mobile Country Code (MCC) etc. In addition, the bearer will be modified during the transmission process of the IP Flows, for example, performing a re-negotiation to the QoS parameters; and when the QoS parameters of the same service used by the subscriber are different, it is possible that the charging rules are different, e.g. if the QoS parameters are decreased, the corresponding rate will be decreased. Here, when the bearer is modified, TPF 205 can transmit the Request Charging Rules to CRF 203 again to request a new charging rule; CRF 203 selects a proper charging rule according to the above-mentioned information provided by TPF 205 and returns the selected charging rule to TPF 205. The charging rule includes the information such as a charging mechanism, a charging type, a charging key, a Service Data Flow filter, a charging rule priority and so on. The charging mechanism can be the online charging or the offline charging; the charging type can be the time span based charging or on the data traffic based charging; the charging key is a parameter relevant to the charging rate, CRF 203 may not directly provide TPF 205 with the charging rate, but only provide TPF 205 with the parameters relevant to the charging rate; the Service Data Flow filter is used for indicating TPF 205 to filter the IP Flows, and then TPF 205 will perform charging to the filtered IP Flows according to the charging rule. The Service Data Flow filter can include an IP five-tuple, and the IP five-tuple can include the information of the source/destination IP address, the source/destination Port Number, and the Protocol ID) etc. For example, CRF 203 indicates TPF 205 to filter the IP Flow with the source address of 10.0.0.1, the destination address of 10.0.0.2, the source Port Number of 20, the destination Port Number of 20 and the protocol type of TCP, and performs charging to the filtered IP Flow according to the charging rule.

CRF 203 can provide TPF 205 with an Event Trigger to make TPF 205 to ask for a new charging rule from CRF 203 when a specific event occurs. For example, CRF 203 requests TPF 205 to ask for a new charging rule from CRF 203 when the event of some certain bearers being modified occurs.

Besides selecting the proper charging rule according to the input information provided by TPF 205, CRF 203 also can select proper charging rule according to the input information of AF 204 or OCS 206. For example, AF 204 notifies CRF 203 of the service type currently used by the subscriber, and CRF 203 will select the corresponding charging rule according to the service type.

OCS 206 is composed of two functional entities: SCP 201 and Service Data Flow Based Credit Control Function (CCF) 202. CCF 202 is a functional entity used for carrying out credit control, and is only applied in online charging systems; CCF 202 can be realized by adding a new function in the existing OCS 206. During an online charging process, CCF 202 is used for performing management and control to the credit of the subscriber, when the subscriber uses a certain service, CCF 202 performs authentication to the credit in the credit pool of the subscriber, and dispatches the credit, which can be used by the subscriber, to TPF 205 through the Gy interface.

Corresponding to the GPRS network, TPF 205 is a GGSN, AF is a service gateway or a service server in the PDN and CRF 203 is a new-added logic entity. TPF 205 is an enforcement point of the charging rule, and CRF 203 is a control point of the charging rule.

At present, the criterion defines that the communication between the CRF and the TPF is performed by means of Diameter sessions, and different Diameter sessions are identified by different Diameter session identifiers. When the bearers are established, the TPF requests the charging rules from the CRF, and the CRF provides the TPF with the charging rules; at this time, a Diameter session between the CRF and the CRF is established and identified by a Diameter session identifier. During the subsequent process of modifying the bearer and deleting the bearer, when the TPF needs to request a charging rule again from the CRF, the TPF uses the Diameter session identifier to identify the mapping relationship between the current Request Charging Rules and the formerly established Diameter session; in a similar way, when the CRF receives the input information used for determining the charging rule provided by the AF or the OCS and needs to provide the TPF with the charging rule on its own initiative, the CRF also needs to use the Diameter session identifier to identify the mapping relationship between the currently provided charging rule and the formerly established Diameter session.

The significance of establishing the Diameter session between the two entities is to establish a State Machine between the two entities, in this way, the two entities can directly use the data in the State Machine when they perform the subsequent interactions, and do not need to provide the relevant information every time they interact. For example, when the bearer is established, the TPF needs to provide some relevant information such as the subscriber information, the bearer properties and the network information; after establishing a Diameter session between the TPF and the CRF, both the TPF and the CRF will store the relational information; during the subsequent interaction process between the TPF and the CRF, such as the TPF requesting charging rule from the CRF while modifying the bearer or deleting the bearer, the OCS and AF providing the CRF with the input information to determine the charging rule, and the CRF transmitting the information such as the charging rule on its own initiative. The transmitter does not need to provide the relevant information to the receiver, but only provides the Diameter session identifier identifying the corresponding Diameter session.

Although the criterion defines that the communication between the CRF and the TPF can be performed by means of Diameter sessions, but the criterion does not indicate the method for establishing the Diameter session.

SUMMARY OF THE INVENTION

According to one embodiment of the present invention, a method for establishing a Diameter session for packet flow based charging, includes:

establishing a Diameter session for each bearer of each subscriber between a Traffic Plane Function (TPF) and a Charging Rule Function (CRF).

According to another embodiment of the present invention, a method for establishing a Diameter session for packet flow based charging, includes:

establishing a Diameter session for bearers with a same Access Point Name (APN) of each subscriber between a Traffic Plane Function (TPF) and a Charging Rule Function (CRF).

According to yet another embodiment of the present invention, a method for establishing Diameter sessions for packet flow based charging, includes:

establishing a Diameter session for all bearers of each subscriber between a Traffic Plane Function (TPF) and a Charging Rule Function (CRF).

Embodiments of the present invention provide multiple ways for establishing the Diameter session between the TPF and the CRF. For example, the Diameter session between the TPF and the CRF can be established for each bearer of each subscriber; or the Diameter session between the TPF and the CRF can be established for the bearers with a same APN of each subscriber; or the Diameter session between the TPF and the CRF can be established for all the bearers of each subscriber. The present invention improves the mechanism for establishing the Diameter session between the TPF and the CRF and makes the implementation of the charging flow more integrated. Moreover, the multiple ways for establishing the Diameter session between the TPF and the CRF provided in the present invention can be flexibly selected according to the practical charging applications.

DETAILED DESCRIPTION OF THE INVENTION

Figure 1:
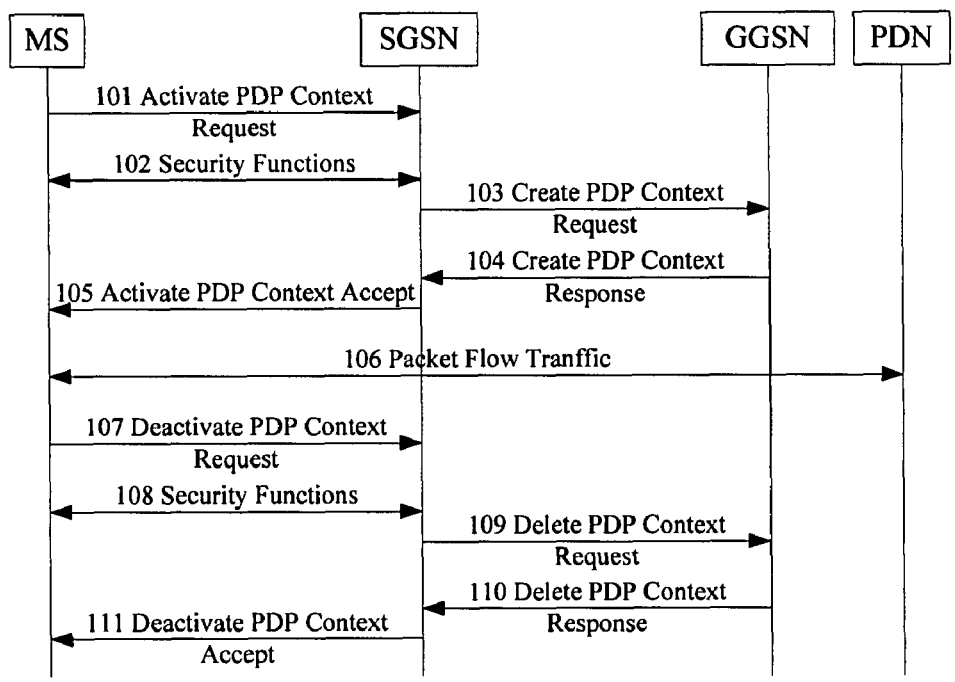
FIG. 1 is a flow chart illustrating a process of performing activation, data transfer and deactivation of a PDP Context.
Figure 2A:
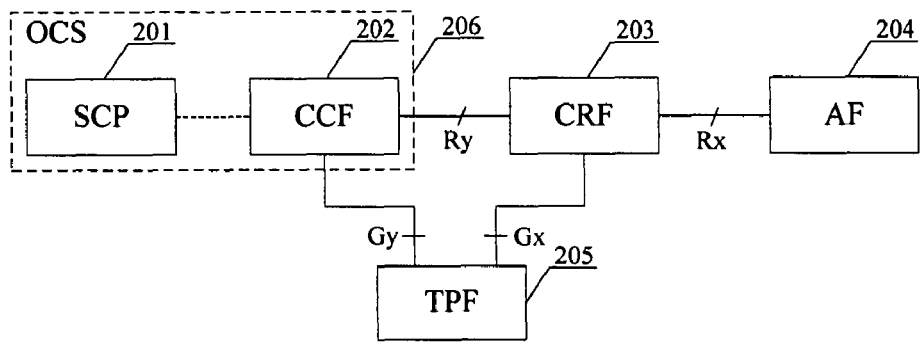
FIG. 2A is a structural diagram illustrating an FBC system supporting online charging.
Figure 2B:
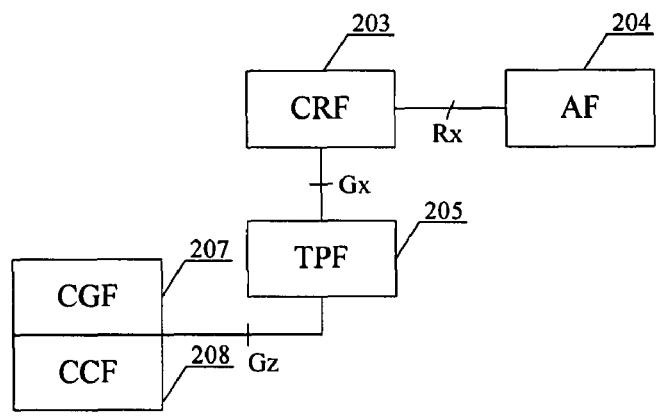
FIG. 2B is a structural diagram illustrating an FBC system supporting offline charging.

The present invention will be described in detail hereinafter with reference to the embodiments and accompanying drawings to make the technical solution and the merits of the present invention clearer.

The embodiments of the invention provide multiple ways for establishing a Diameter session between a TPF and a CRF. For example, the Diameter session between the TPF and the CRF can be established for each bearer of each subscriber, which is, for GPRS, to establish the Diameter session between the TPF and the CRF for each PDP Context State Model of each subscriber. The Diameter session between the TPF and the CRF also can be established for the bearers with a same APN of each subscriber, which is, for GPRS, to establish the Diameter session between the TPF and the CRF for all the bearers with the same APN of each subscriber. The Diameter session between the TPF and the CRF also can be established for all the bears of each subscriber, which is, for GPRS, to establish the Diameter session between the TFP and the CRF for the GPRS Bearer Activate/Deactivate State Models of each subscriber. After the TPF/CRF Diameter session is established, the TPF and the CRF perform information interaction, for example, the CRF provides the TPF with a charging rule, and the TPF performs charging to a filtered IP Flow according the charging rule provided by the CRF.

Establishing the Diameter session between the TPF and the CRF for each bearer of each subscriber refers to that a new Diameter session between the TPF and the CRF is established when the bearer is established. Each TPF/CRF Diameter Session State Model corresponds to a single Bearer Establishing State Model; when the bearer is established, the TPF/CRF Diameter session is established too, and when the bearer is terminated, the TPF/CRF Diameter session is released. For GPRS, each TPF/CRF Diameter Session State Model corresponds to a single PDP Context State Model. In GGSN, each activated GPRS PDP Context has at most one PDP Context State Model.

For a specific Diameter session establishing process, if the Diameter session identifier is allocated by the TPF, when each bearer is established, the TPF will establish a new TPF/CRF Diameter Session State Model, allocates a new Diameter session identifier to the Diameter session, stores the corresponding information such as the Diameter session identifier, subscriber information, bearer properties, network information and so on, and provides the CRF with the allocated Diameter session identifier. The Diameter session identifier can be carried in the Request Charging Rules transmitted from the TPF to the CRF. On receiving the Request Charging Rules carrying the new Diameter session identifier, the CRF establishes a new TPF/CRF Diameter Session State Model and stores the corresponding information such as the Diameter session identifier, the subscriber information, the bearer properties, the network information and so on.

If the Diameter session identifier is allocated by the CRF, when each bearer is established, the TPF will transmits to the CRF a Request Charging Rules, which carries a corresponding Bearer Establishing Indication used for identifying that the Request Charging Rules is initiated based on the bearer establishment; the CRF establishes a new TPF/CRF Diameter Session State Model according to the Bearer Establishing Indication, allocates a new Diameter session identifier to the Diameter session, stores the corresponding information such as the Diameter session identifier, the subscriber information, the bearer properties, the network information and so on, and provides the allocated Diameter session identifier to the TPF. The Diameter session identifier can be carried in the message carrying the charging rule returned from the CRF to the TPF. On receiving the Response Charging Rules carrying the new Diameter session identifier, the TPF establishes a new TPF/CRF Diameter Session State Model and stores the corresponding information such as the Diameter session identifier, the subscriber information, the bearer properties, the network information and so on.

If the Diameter session identifier is jointly allocated by the TPF and the CRF, when each bearer is established, the TPF establishes a new TPF/CRF Diameter Session State Model, allocates a new TPF-part Diameter session identifier to the Diameter session, stores the corresponding information such as the TPF-part Diameter session identifier, the subscriber information, the bearer properties, the network information and so on, and provides the allocated TPF-part Diameter session identifier to the CRF. The TPF-part Diameter session identifier can be carried in the Request Charging Rules transmitted from the TPF to the CRF. On receiving the Request Charging Rules carrying the TPF-part Diameter session identifier, the CRF establishes a new TPF/CRF Diameter Session State Model, allocates a CRF-part Diameter session identifier, combines the CRF-part Diameter session identifier and the TPF-part Diameter session identifier provided by the TPF into an integrated Diameter session identifier, stores the corresponding information such as the integrated Diameter session identifier, the subscriber information, the bearer properties, the network information and so on, and provides the TPF with the integrated Diameter session identifier. The integrated Diameter session identifier can be carried in the message carrying the charging rules returned from the CRF to the TPF, i.e. the Response Charging Rules. On receiving the Response Charging Rules carrying the integrated Diameter session identifier, the TPF acquires the formerly established TPF/CRF Diameter Session State Model according to the TPF-part Diameter session identifier of the integrated Diameter session identifier and updates the stored information, e.g. updates the TPF-part Diameter session identifier to the integrated Diameter session identifier.

After establishing the TPF/CRF Diameter session, the TPF and the CRF perform information interaction, for example, the CRF provides the TPF with the charging rule, and the TPF performs charging to the filtered IP Flow according to the charging rule provided by the CRF.

Figure 3:
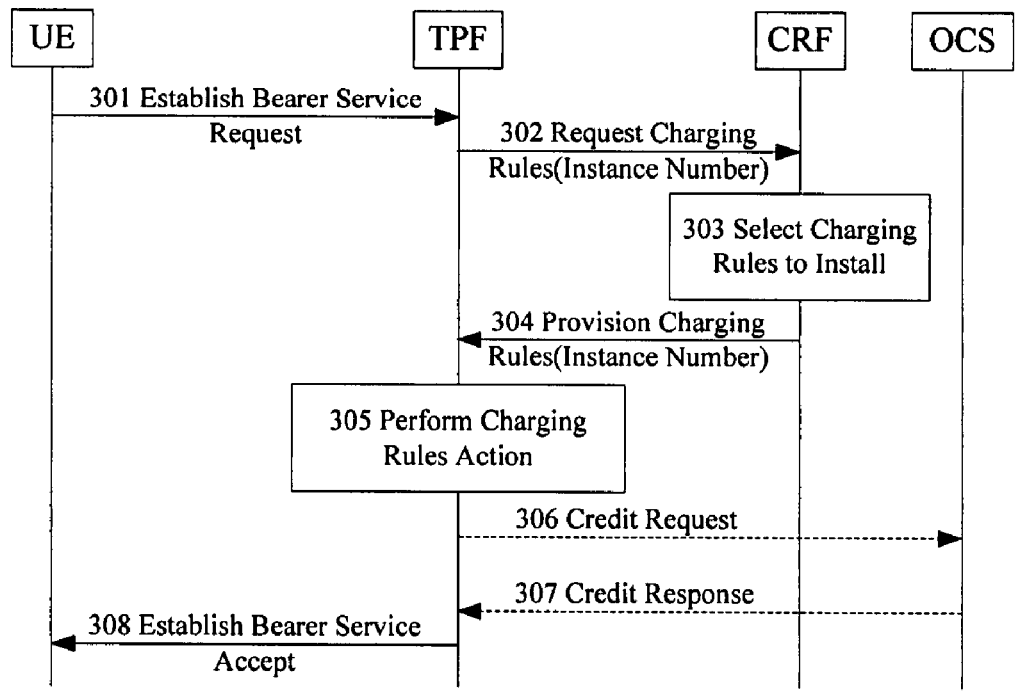
FIG. 3 is a schematic diagram illustrating a process of establishing a TPF/CRF Diameter session for each bearer, in which the Diameter session identifier is allocated by the TPF.

FIG. 3 is a schematic diagram illustrating a process of establishing a TPF/CRF Diameter session for each bearer, in which the Diameter session identifier is allocated by the TPF. As shown in FIG. 3, the Diameter session establishing process, in which the TPF/CRF Diameter session is established for each bearer and the Diameter session identifier is allocated by the TPF, includes the following steps.

Step 301: a User Equipment (UE) transmits an Establish Bearer Service Request to the TPF; while in a GPRS network, the GGSN receives a Create PDP Context Request.

Step 302: on receiving the Establish Bearer Service Request, the TPF creates a TPF/CRF Diameter Session State Model, allocates a Diameter session identifier to the current Diameter session and stores the corresponding information such as the Diameter session identifier, the subscriber information, the bearer properties, the network information and so on, then transmits to the CRF a Request Charging Rules, which carries the allocated Diameter session identifier and the input information for the CRF to determine the charging rule.

Step 303: on receiving the Request Charging Rules, the CRF establishes a TPF/CRF Diameter Session State Model according to the allocated Diameter session identifier carried in the Request Charging Rules, stores the corresponding information such as the Diameter session identifier, the subscriber information, the bearer properties, the network information and so on. Then the CRF selects a proper charging rule according to the input information carried in the Request Charging Rules, or according to the relevant input information provided by the AF. If the charging mechanism is the online charging, the CRF can also select the proper charging rule according to the relevant input information provided by the OCS.

Step 304: after selecting the proper charging rule, the CRF returns to the TPF a Provision Charging Rules as a response to the Request Charging Rules. The Provision Charging Rules can carry the selected charging rule, the charging rule action indication and the Diameter session identifier allocated in step 302. The mapping relationship between the current Response Charging Rules and the former Request Charging Rules is identified by the Diameter session identifier.

Step 305: on receiving the Provision Charging Rules, the TPF indexes the corresponding Diameter session according to the Diameter session identifier, and performs corresponding processing to the charging rule selected by the CRF according to the charging rule action indication. If the charging mechanism is online charging, proceeds to steps 306-308; if the charging mechanism is offline charging, proceeds to step 308.

Step 306: the TPF transmits a Credit Request to the OCS according to the online charging indication in the charging rule, requesting the credit information of the subscriber.

Step 307: on receiving the Credit Request, the OCS determines the credit of the subscriber, and then returns a Credit Response to the TPF; if the OCS succeeds in determining the credit of the subscriber, the Credit Response carries the credit of the subscriber; if the OCS fails to determine the credit of the subscriber, the Credit Response can carry an error reason value.

Step 308: the TPF returns an Establish Bearer Service Accept to the UE. If the TPF is able to establish the bearer according to the prior information, e.g. the OCS returns the credit of the subscriber, the Establish Bearer Service Accept is an Establish Bearer Service Successfully Accept; the TPF accepts the Establish Bearer Service Request initiated by the UE, and continues the subsequent bearer establishing flow. If the TPF can not establish the bearer according to the prior information, e.g. the OCS does not return the credit of the subscriber, the Establish Bearer Service Accept is an Establish Bearer Service Unsuccessfully Accept, and the TPF rejects the Establish Bearer Service Request initiated by the UE.

Figure 4:
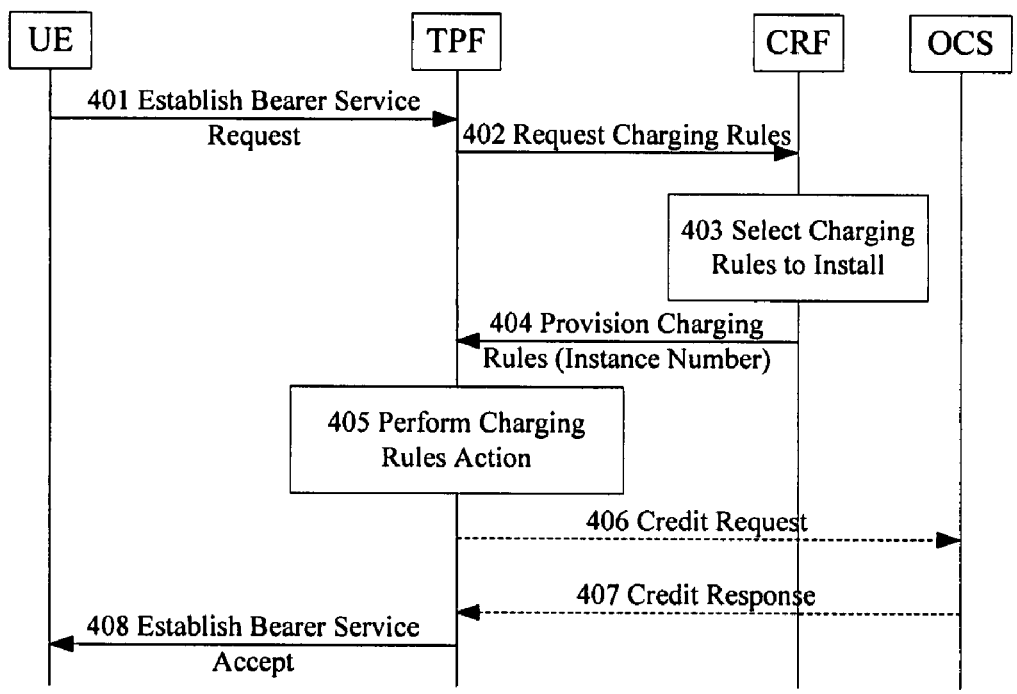
FIG. 4 is a schematic diagram illustrating a process of establishing a TPF/CRF Diameter session for each bearer, in which the Diameter session identifier is allocated by the CRF.

FIG. 4 is a schematic diagram illustrating a process of establishing a TPF/CRF Diameter session for each bearer, in which the Diameter session identifier is allocated by the CRF. As shown in FIG. 4, the Diameter session establishing process, in which the TPF/CRF Diameter session is established for each bearer and the Diameter session identifier is allocated by the CRF, includes the following steps.

Step 401 is as same as step 301.

Step 402: on receiving the Establish Bearer Service Request, the TPF transmits to the CRF a Request Charging Rules, which carries the input information for the CRF to determine the charging rule. The Request Charging Rules can further carry the Bearer Establishing Indication used for identifying that the Request Charging Rules is initiated based on the bearer establishment.

Step 403: on receiving the Request Charging Rules, the CRF establishes a TPF/CRF Diameter session State Model according to the Bearer Establishing Indication carried in the Request Charging Rules, allocates a new Diameter session identifier to the current Diameter session and stores the corresponding information such as the Diameter session identifier, the subscriber information, the bearer properties, the network information and so on. Then the CRF selects a proper charging rule according to the input information carried in the Request Charging Rules, or according to the relevant input information provided by the AF. If the charging mechanism is online charging, the CRF can also select the proper charging rule according to the relevant input information provided by the OCS.

Step 404: after selecting the proper charging rule, the CRF returns to the TPF a Provision Charging Rules as a response to the Request Charging Rules. The Provision Charging Rules can carry the selected charging rule, the charging rule action indication and the allocated Diameter session identifier.

Step 405: on receiving the provided charging rule, the TPF establishes a new TPF/CRF Diameter Session State Model according to the allocated Diameter session identifier carried in the Provision Charging Rules, stores the corresponding information such as the Diameter session identifier, the subscriber information, the bearer properties, the network information and so on, and performs corresponding processing to the charging rule selected by the CRF according to the charging rule action indication. If the charging mechanism is online charging, proceeds to steps 406-408; if the charging mechanism is offline charging, proceeds to step 408.

Steps 406-407 are as same as steps 306-307.

Step 408 is as same as step 308.

Figure 5:
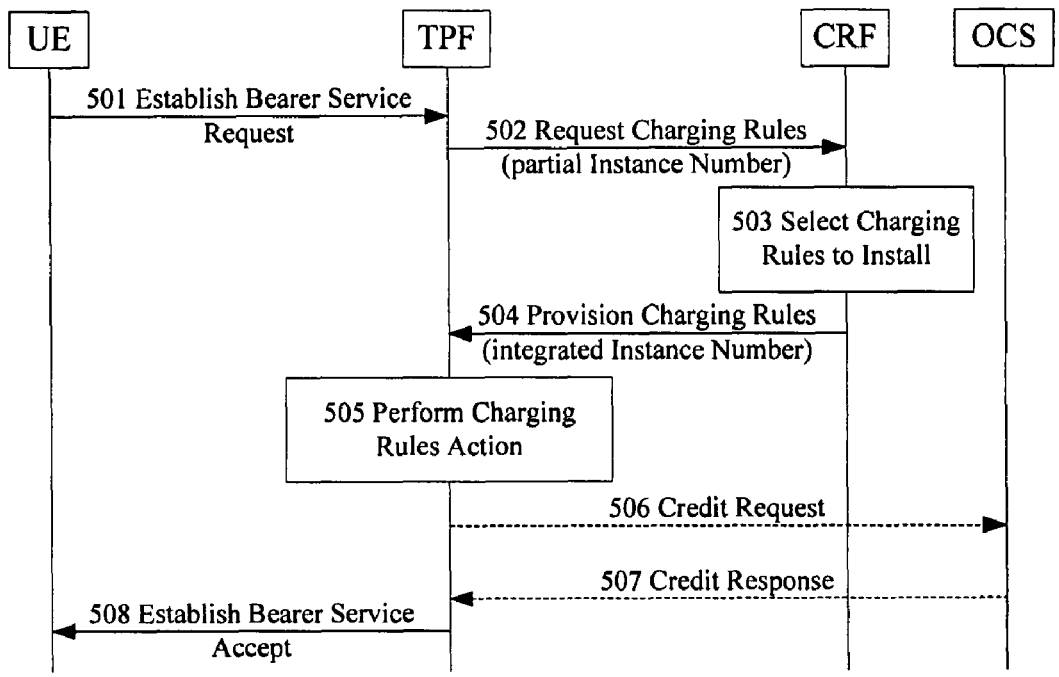
FIG. 5 is a schematic diagram illustrating a process of establishing a TPF/CRF Diameter session for each bearer, in which the Diameter session identifier is allocated by the TPF and the CRF.

FIG. 5 is a schematic diagram illustrating a process of establishing a TPF/CRF Diameter session for each bearer, in which the Diameter session identifier is allocated by the TPF and the CRF. As shown in FIG. 5, the Diameter session establishing process, in which the TPF/CRF Diameter session is established for each bearer and the Diameter session identifiers are jointly allocated by the TPF and the CRF, includes the following steps.

Step 501 is as same as step 301.

Step 502: on receiving the Establish Bearer Service Request, the TPF establishes a TPF/CRF Diameter Session State Model, allocates a TPF-part Diameter session identifier to the current Diameter session and stores the corresponding information such as the TPF-part Diameter session identifier, the subscriber information, the bearer properties, the network information and so on, then transmits to the CRF a Request Charging Rules, which carries the allocated TPF-part Diameter session identifier and the input information for the CRF to determine the charging rule.

Step 503: on receiving the Request Charging Rules, the CRF establishes a TPF/CRF Diameter Session State Model according to the un-integrated Diameter session identifier, i.e. the TPF-part Diameter session identifier, carried in the Request Charging Rules, allocates a CRF-part Diameter session identifier, combines the TPF-part Diameter session identifier received in step 502 and the CRF-part Diameter session identifier currently allocated into an integrated Diameter session indentifier, stores the corresponding information such as the integrated Diameter session identifier, the subscriber information, the bearer properties, the network information and so on. Then the CRF selects a proper charging rule according to the input information carried in the Request Charging Rules, or according to the relevant input information provided by the AF. If the charging mechanism is online charging, the CRF can also select the proper charging rule according to the relevant input information provided by the OCS.

Step 504: after selecting the proper charging rule, the CRF returns to the TPF a Provision Charging Rules as a response to the Request Charging Rules. The Provision Charging Rules can carry the selected charging rule, the charging rule action indication and the integrated Diameter session identifier jointly allocated by the TPF and the CRF.

Step 505: on receiving the Provision Charging Rules carrying the integrated Diameter session identifier, the TPF acquires the formerly established TPF/CRF Diameter Session State Model according to the TPF-part Diameter session identifier of the integrated Diameter session identifier, and updates the stored information, e.g., updates the TPF-part Diameter session identifier to the integrated Diameter session identifier. Then the TPF performs corresponding processing to the charging rule selected by the CRF according to the charging rule action indication. If the charging mechanism is online charging, proceeds to steps 506-508; if the charging mechanism is offline charging, proceeds to step 508.

Step 506-507 are same as step 306-307.

Step 508 is same as step 308.

When establishing TPF/CRF Diameter sessions for each bearer of each subscriber, the operations in each TPF/CRF Diameter session, e.g. providing, modifying or deleting the charging rules, or providing an Event Trigger etc., are independent from each other. In other words, these operations are for each bearer of each subscriber, and the CRF can perform corresponding FBC control to each of the subscriber bearers through the TPF/CRF Diameter Session State Model.

Figure 6:
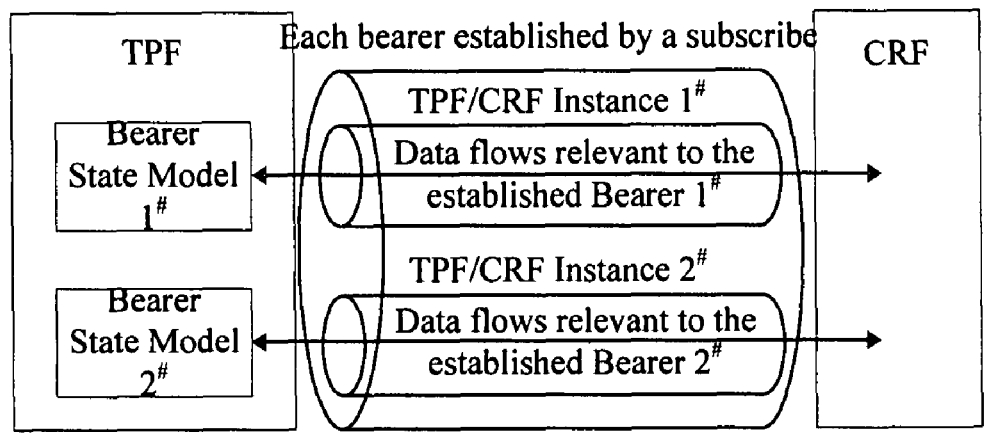
FIG. 6 is a schematic diagram illustrating a process of establishing a TPF/CRF Diameter session for each bearer of each subscriber.

FIG. 6 is a schematic diagram illustrating a process of establishing a TPF/CRF Diameter session for each bearer of each subscriber. As shown in FIG. 6, for a single subscriber of the TPF, each Bearer State Model in the TPF corresponds to a TPF/CRF Diameter Session State Model. In other words, the TPF/CRF Diameter Session State Models are established when the Bearer State Models are established, while for GPRS, the TPF/CRF Diameter Session State Models are established when the Create PDP Context Request is received; the TPF/CRF Diameter Session State Models are released when the Bearer State Models are released, while for GPRS, the TPF/CRF Diameter Session State Models are released when the corresponding Delete PDP Context Request is received.

In addition, the Diameter session between the TPF and the CRF can be established for the bearers with a same APN of each subscriber. In other words, a new Diameter session between the TPF and the CRF is established when an IP Flow bearer for a new APN is established for each subscriber; and for the subsequent new bearer of the same APN established by the same subscriber, the FBC controls to the bearer is performed based on the formerly established Diameter session instead of establishing a new Diameter session. One subscriber can simultaneously establish multiple bearers with a same APN, which, for GPRS, means that one subscriber can simultaneously create multiple PDP Contexts with the same APN. When one subscriber establishes a new bearer, the entity allocating the Diameter session identifier determines whether the CRF/TPF Diameter Session State Model for the APN of the subscriber has been established; if the CRF/TPF Diameter Session State Model for the APN of the subscriber has been established, the relationship between the currently established bearer and the formerly established TPF/CRF Diameter session is identified by the Diameter session identifier formerly allocated for the APN of the subscriber; otherwise, a new TPF/CRF Diameter Session State Model is established and a new Diameter session identifier is allocated.

For a specific Diameter session establishing process, if the Diameter session identifier is allocated by the TPF, when the subscriber creates a new bearer, the TPF determines whether the CRF/TPF Diameter Session State Model for the APN of the subscriber has been established; if the CRF/TPF Diameter Session State Model for the APN of the subscriber has been established, the TPF will directly employ the Diameter session identifier in the TPF/CRF Diameter Session State Model formerly established for the APN of the subscriber to identify the relationship between the currently established bearer and the formerly established TPF/CRF Diameter session; otherwise, the TPF will establish a TPF/CRF Diameter Session State Model for the APN of the subscriber, allocates a new Diameter session identifier to the Diameter session, and stores the corresponding information such as the Diameter session identifier, the subscriber information, the bearer properties, the network information and so on, and provides the CRF with the allocated Diameter session identifier. The Diameter session identifier can be carried in the Request Charging Rules transmitted from the TPF to the CRF. On receiving the Request Charging Rules carrying the new Diameter session identifier, the CRF establishes a new TPF/CRF Diameter Session State Model and stores the corresponding information such as the Diameter session identifier, the subscriber information, the bearer properties, the network information and so on.

If the Diameter session identifier is allocated by the CRF, when the subscriber creates a new bearer, the TPF will transmits to the CRF a Request Charging Rules, which carries a corresponding Bearer Establishing Indication used for identifying that the Request Charging Rules is initiated based on the bearer establishment; the TPF can further provide the CRF with a subscriber identifier, APN information and TPF address information. The CRF determines whether the TPF/CRF Diameter Session State Model has been established for the APN of the subscriber with the corresponding TPF according to the Bearer Establishing Indication, the subscriber identifier, the APN information and the TPF address information provide by the TPF, if the TPF/CRF Diameter Session State Model has been established for the APN of the subscriber, the CRF will directly employ the Diameter session identifier of the TPF/CRF Diameter Session State Model formerly established for the APN of the subscriber to identify the relationship between the currently established bearer and the formerly established TPF/CRF Diameter session; otherwise, the CRF establishes a PF/CRF Diameter Session State Model for the APN of the subscriber, allocates a new Diameter session identifier to the Diameter session, stores the corresponding information such as the Diameter session identifier, the subscriber information, the bearer properties, the network information and so on, and then provides the TPF with the allocated Diameter session identifier. The Diameter session identifier can be carried in the message of the charging rule returned from the CRF to the TPF. On receiving the Response Charging Rules carrying the new Diameter session identifier, the TPF establishes a new TPF/CRF Diameter Session State Model and stores the corresponding information such as the Diameter session identifier, the subscriber information, the bearer properties, the network information and so on.

If the Diameter session identifier is jointly allocated by the TPF and the CRF, when the subscriber establishes a new bearer, the TPF determines whether the CRF/TPF Diameter Session State Model for the APN of the subscriber has been established; if the CRF/TPF Diameter Session State Model for the APN of the subscriber has been established, the TPF will directly employ the Diameter session identifier in the TPF/CRF Diameter Session State Model formerly established for the APN of the subscriber to identify the relationship between the currently established bearer and the formerly established TPF/CRF Diameter session; otherwise, the TPF establishes a TPF/CRF Diameter Session State Model for the APN of the subscriber, allocates a new TPF-part Diameter session identifier to the Diameter session, stores the corresponding information such as the TPF-part Diameter session identifier, the subscriber information, the bearer properties, the network information and so on, and provides the CRF with the allocated TPF-part Diameter session identifier. The TPF-part Diameter session identifier can be carried in the Request Charging Rules transmitted from the TPF to the CRF. On receiving the Request Charging Rules carrying the TPF-part Diameter session identifier, the CRF establishes a new TPF/CRF Diameter Session State Model, allocates a CRF-part Diameter session identifier, combines the CRF-part Diameter session identifier and the TPF-part Diameter session identifier provided by the TPF into an integrated Diameter session identifier, stores the corresponding information such as the integrated Diameter session identifier, the subscriber information, the bearer properties, the network information and so on, and provides the TPF with the integrated Diameter session identifier. The integrated Diameter session identifier can be carried in the message carrying the charging rules returned from the CRF to the TPF, i.e. the Response Charging Rules. On receiving the Response Charging Rules carrying the integrated Diameter session identifier, the TPF acquires the formerly established TPF/CRF Diameter Session State Model according to the TPF-part Diameter session identifier of the integrated Diameter session identifier and updates the stored information, e.g. updates the TPF-part Diameter session identifier to the integrated Diameter session identifier.

After establishing the TPF/CRF Diameter session, the TPF and the CRF perform information interaction, for example, the CRF provides the TPF with the charging rule, and the TPF performs charging to the filtered IP Flow according to the charging rule provided by the CRF.

Figure 7:
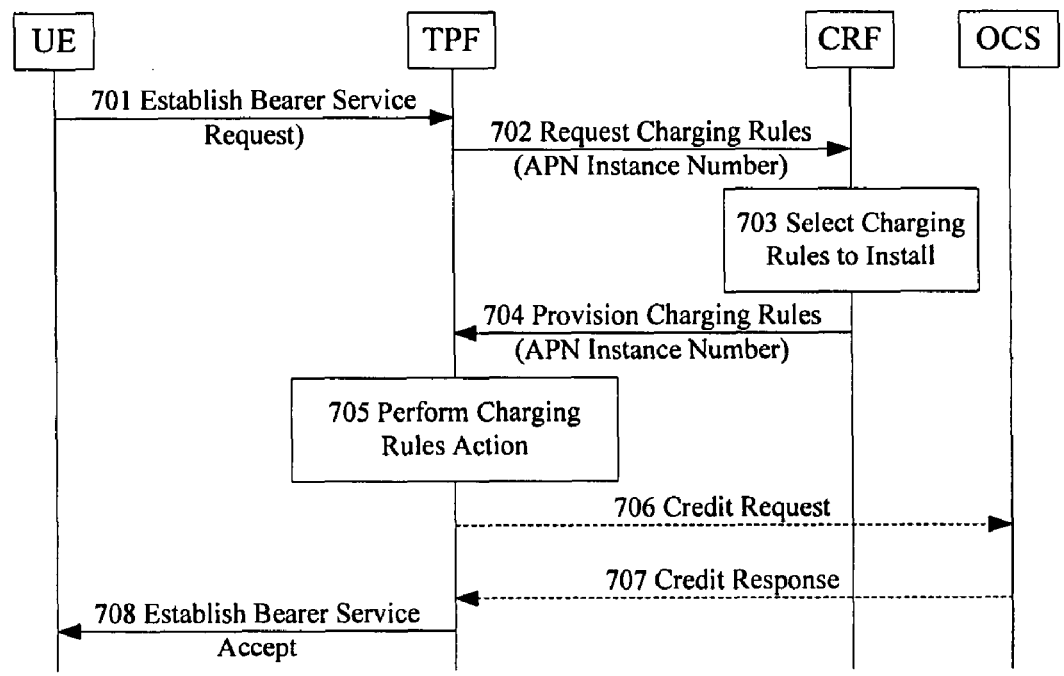
FIG. 7 is a schematic diagram illustrating a process of establishing a TPF/CRF Diameter session for bearers with a same APN of each subscriber, in which the Diameter session identifier is allocated by the TPF.

FIG. 7 is a schematic diagram illustrating a process of establishing a TPF/CRF Diameter session for bearers with a same APN of each subscriber, in which the Diameter session identifier is allocated by the TPF. As shown in FIG. 7, the Diameter session establishing process, in which the TPF/CRF Diameter session is established for the bearers with a same APN of each subscriber and the Diameter session identifier is allocated by the TPF, includes the following steps.

Step 701 is as same as step 301.

Step 702: on receiving the Establish Bearer Service Request, according to the subscriber identifier information and the APN information, the TPF determines whether the Diameter session for the APN of the subscriber between the TPF and the CRF has been established. If the Diameter session for the APN of the subscriber between the TPF and the CRF has been established, the TPF directly transmits to the CRF a Request Charging Rules carrying the input information for the CRF to determine the charging rules and the formerly allocated Diameter session identifier, which identifies the relationship between the Request Charging Rules in the current Diameter session and the formerly established TPF/CRF Diameter session; otherwise, the TPF establishes a TPF/CRF Diameter Session State Module, allocates a new Diameter session identifier and stores the corresponding information such as the Diameter session identifier, the subscriber information, the bearer properties, the network information and so on, then transmits to the CRF a Request Charging Rules carrying the input information for the CRF to determine the charging rule and the newly allocated Diameter session identifier.

Step 703 is as same as step 303.
Step 704 is as same as step 304.
Step 705 is as same as step 305.
Step 706-707 are as same as step 306-307.
Step 708 is as same as step 308.

Figure 8:
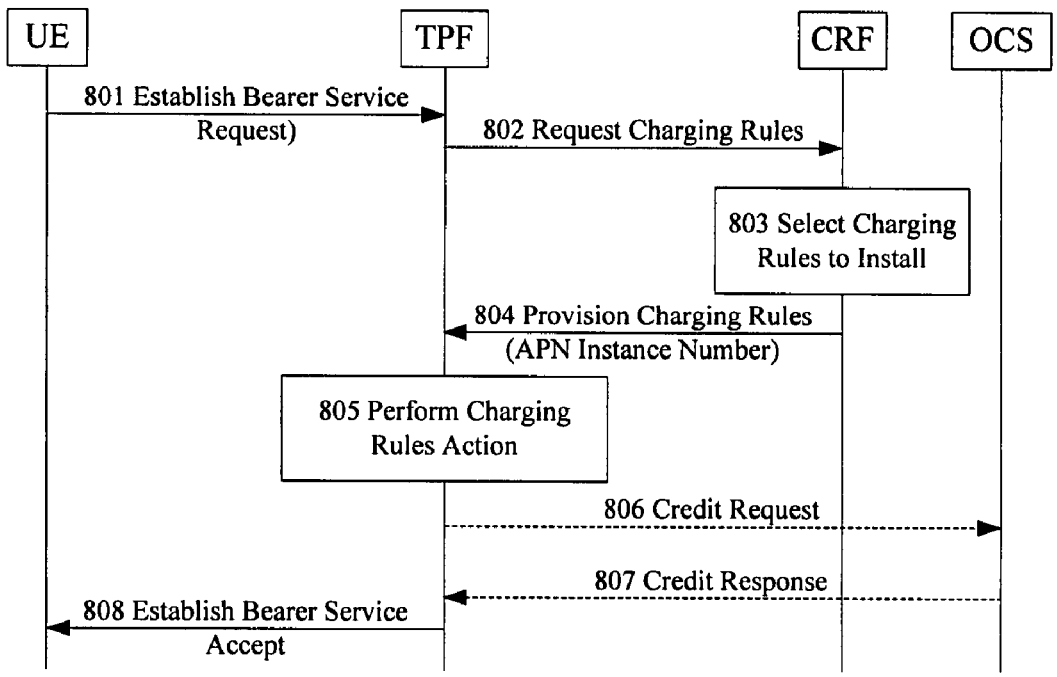
FIG. 8 is a schematic diagram illustrating a process of establishing a TPF/CRF Diameter session for bearers with a same APN of each subscriber, in which the Diameter session identifier is allocated by the CRF.

FIG. 8 is a schematic diagram illustrating a process of establishing a TPF/CRF Diameter session for bearers with a same APN of each subscriber, in which the Diameter session identifier is allocated by the CRF. As shown in FIG. 8, the Diameter session establishing process, in which the TPF/CRF Diameter session is established for the bearers with a same APN of each subscriber and the Diameter session identifier is allocated by the CRF includes the following steps.

Step 801 is as same as step 401.

Step 802: on receiving the Establish Bearer Service Request, the TPF transmits to the CRF a Request Charging Rules carrying the input information for the CRF to determine the charging rules and a Bearer Establishing Indication used for identifying that the Request Charging Rules is initiated based on the bearer establishment, as well as subscriber identifier information, APN information and TPF address information.

Step 803: on receiving the Request Charging Rules, according to the Bearer Establishing Indication, the subscriber identifier information, the APN information and the TPF address information carried in the Request Charging Rules, the CRF determines whether the Diameter session for the APN of the subscriber between the TPF and the CRF has been established. If the Diameter session for the APN of the subscriber between the TPF and the CRF has been established, the CRF directly returns to the TPF a Provision Charging Rules carrying the identified charging rule, the charging rule action indication and the formerly allocated Diameter session identifier, which identifies the relationship between the Provision Charging Rules in the current Diameter session and the formerly established TPF/CRF Diameter session; otherwise, the CRF establishes a TPF/CRF Diameter Session State Model, allocates a new Diameter session identifier to the current Diameter session and stores the corresponding information such as the Diameter session identifier, the subscriber information, the bearer properties, the network information and so on. Then the CRF selects a proper charging rule according to the input information carried in the Request Charging Rules, or according to the relevant input information provided by the AF. If the charging mechanism is online charging, the CRF can also select the proper charging rule according to the relevant input information provided by the OCS.

Step 804 is as same as step 404.
Step 805 is as same as step 405.
Step 806-807 are as same as step 406-407.
Step 808 is as same as step 408.

Figure 9:
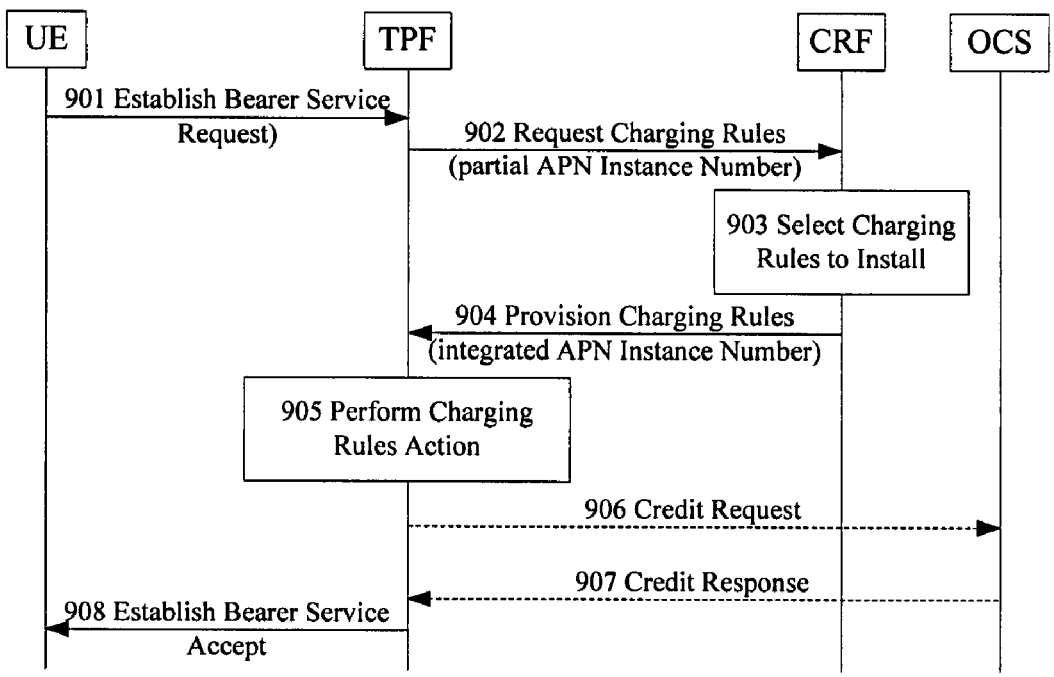
FIG. 9 is a schematic diagram illustrating a process of establishing a TPF/CRF Diameter session for bearers with a same APN of each subscriber, in which the Diameter session identifier is allocated by the TPF and the CRF.

FIG. 9 is a schematic diagram illustrating a process of establishing a TPF/CRF Diameter session for bearers with a same APN of each subscriber, in which the Diameter session identifier is jointly allocated by the TPF and the CRF. As shown in FIG. 9, the Diameter session establishing process, in which the TPF/CRF Diameter session is established for the bearers with a same APN of each subscriber and the Diameter session identifier is jointly allocated by the TPF and the CRF, includes the following steps.

Step 901 is as same as step 501.

Step 902: on receiving the Request Charging Rules, according to the subscriber identifier information and the APN information, the TPF determines whether the Diameter session for the APN of the subscriber between the TPF and the CRF has been established. If the Diameter session for the APN of the subscriber between the TPF and the CRF has been established, the TPF directly transmits to the CRF a Request Charging Rules carrying the input information for the CRF to determine the charging rule, and the formerly allocated Diameter session identifier, which identifies the relationship between the Request Charging Rules in the current Diameter session and the formerly established TPF/CRF Diameter session; otherwise, the TPF establishes a TPF/CRF Diameter Session State Model, allocates a new TPF-part Diameter session identifier to the current Diameter session and stores the corresponding information such as the TPF-part Diameter session identifier, the subscriber information, the bearer properties, the network information and so on, then transmits to the CRF a Request Charging Rules, which carries the input information for the CRF to determine the charging rule and the newly allocated TPF-part Diameter session identifier.

Step 903 is as same as step 503.

Step 904 is as same as step 504.

Step 905 is as same as step 505.

Step 906-907 are as same as step 506-507.

Step 908 is as same as step 508.

When establishing TPF/CRF Diameter sessions for the bearers with a same APN of each subscriber, the operations in each TPF/CRF Diameter session, e.g. providing, modifying or deleting the charging rules, or providing an Event Trigger etc., are for all the bearers with the same APN of the subscriber; and the CRF can perform uniform FBC control to the bearers with the same APN of the subscriber through the TPF/CRF Diameter Session State Model.

Figure 10:
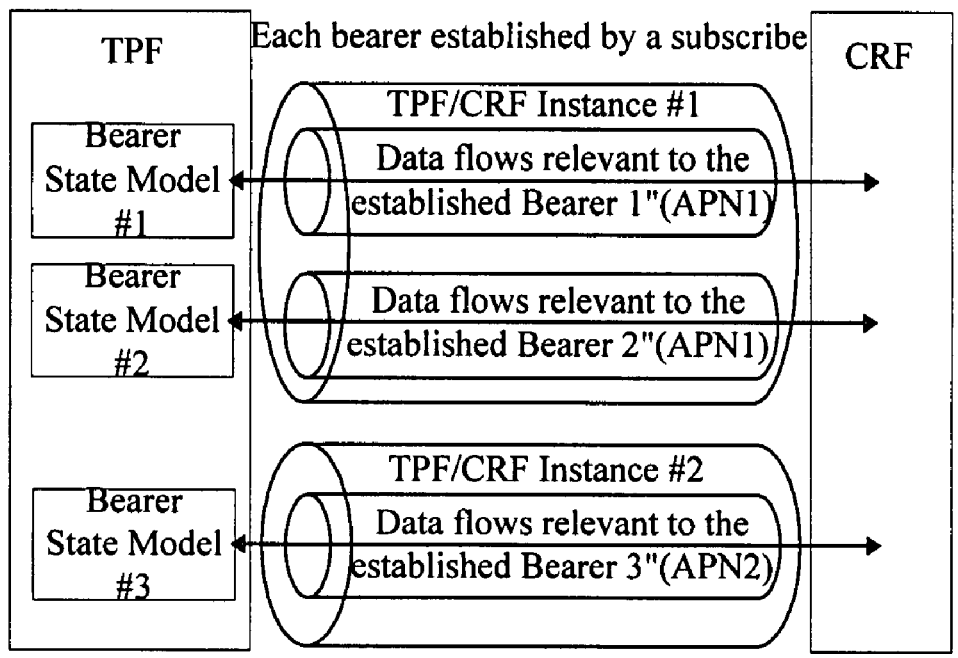
FIG. 10 is a schematic diagram illustrating a process of establishing a TPF/CRF Diameter session for bearers with a same APN of each subscriber.

FIG. 10 is a schematic diagram illustrating a process of establishing a TPF/CRF Diameter session for bearers with a same APN of each subscriber. As shown in FIG. 10, for one subscriber of the TPF, each TPF/CRF Diameter Session State Model includes one or multiple Bearer Establishing State Models, and these established multiple bearers have a same APN. In other words, for GPRS, the TPF/CRF Diameter Session State Models is composed of one or multiple GPRS PDP Context State Models; and when the TPF/CRF Diameter Session State Models is composed of multiple GPRS PDP Context State Models, the bearers in these multiple GPRS PDP Context State Models have a same APN.

In addition, to enable the CRF to perform FBC control to each bearer of the subscriber, when each bearer is established, the TPF can be demanded to allocate a corresponding Bearer ID to the bearer. The Bearer ID is transmitted to the CRF when the TPF requests the charging rule from the CRF for the first time, or when the TPF reports the Event Trigger to the CRF for the first time. It needs to be guaranteed that the Bearer ID allocated by the TPF is unique for the bearers with the same APN of the same subscriber, i.e. the Bearer IDs of different bearers with the same APN of the same subscriber will not be the same. The CRF can perform different FBC control to different bearers of the same subscriber according to the TPF/CRF Diameter Session State Model and the Bearer ID.

In addition, a new TPF/CRF Diameter session between the TPF and the CRF can be established for all the bearers of each subscriber. In other words, when the first bearer of each subscriber is established in the TPF, a new TPF/CRF Diameter session is established, and it does not need to establish any new Diameter session for the subsequent new bearers of the subscriber established in the TPF. When a subscriber establishes a new bearer in the TPF, the entity allocating the Diameter session identifier determines whether a TPF/CRF Diameter session has been established for all the bearers of the subscriber in the TPF, if the TPF/CRF Diameter session has been established for all the bearers of the subscriber in the TPF, the relationship between the currently established bearer and the formerly established TPF/CRF Diameter session is identified by the Diameter session identifier formerly allocated for all the bearers of the subscriber; otherwise, a TPF/CRF Diameter Session State Model for all the bearers of the subscriber is established and a new Diameter session identifier is allocated.

For a specific Diameter session establishing process, if the Diameter session identifier is allocated by the TPF, when the subscriber creates a new bearer, according to the subscriber identifier information, the TPF determines whether the CRF/TPF Diameter Session State Model for all the bearers of the subscriber has been established; if the CRF/TPF Diameter Session State Model for all the bearers of the subscriber has been established, the TPF will directly employ the Diameter session identifier in the TPF/CRF Diameter Session State Model formerly established for all the bearers of the subscriber to identify the relationship between the currently established bearer and the formerly established TPF/CRF Diameter session; otherwise, i.e. the currently established bear is the first bearer established by the subscriber in the TPF, the TPF will establish a TPF/CRF Diameter Session State Model for all the bearers of the subscriber, allocates a new Diameter session identifier to the Diameter session and stores the corresponding information such as the Diameter session identifier, the subscriber information, the bearer properties, the network information and so on, and provides the CRF with the newly allocated Diameter session identifier. The Diameter session identifier can be carried in the Request Charging Rules transmitted from the TPF to the CRF. On receiving the Request Charging Rules carrying the new Diameter session identifier, the CRF establishes a new TPF/CRF Diameter Session State Model and stores the corresponding information such as the Diameter session identifier, the subscriber information, the bearer properties, the network information and so on.

If the Diameter session identifier is allocated by the CRF, when the subscriber creates a new bearer, the TPF will transmits to the CRF a Request Charging Rules, which carries a corresponding Bearer Establishing Indication used for identifying that the Request Charging Rules is initiated based on the bearer establishment; the TPF can further provide the CRF with a subscriber identifier and TPF address information. According to the Bearer Establishing Indication, the subscriber identifier, and the TPF address information provide by the TPF, The CRF determines whether the TPF/CRF Diameter Session State Model for all the bearers of the subscriber has been established with the corresponding TPF; if the TPF/CRF Diameter Session State Model for all the bearers of the subscriber has been established, the CRF will directly employ the Diameter session identifier of the TPF/CRF Diameter Session State Model formerly established for all the bearers of the subscriber to identify the relationship between the currently established bearer and the formerly established TPF/CRF Diameter session; otherwise, i.e. the currently established bear is the first bearer established by the subscriber in the corresponding TPF, the CRF establishes a TPF/CRF Diameter Session State Model for all the bearers of the subscriber, allocates a new Diameter session identifier to the Diameter session, stores the corresponding information such as the Diameter session identifier, the subscriber information, the bearer properties, the network information and so on, and then provides the TPF with the newly allocated Diameter session identifier. The Diameter session identifier can be carried in the message of the charging rule returned from the CRF to the TPF. On receiving the Response Charging Rules carrying the new Diameter session identifier, the TPF establishes a new TPF/CRF Diameter Session State Model and stores the corresponding information such as the Diameter session identifier, the subscriber information, the bearer properties, the network information and so on.

If the Diameter session identifier is jointly allocated by the TPF and the CRF, when the subscriber establishes a new bearer, according to the subscriber identifier information, the TPF determines whether the CRF/TPF Diameter Session State Model for all the bearers of the subscriber has been established; if the CRF/TPF Diameter Session State Model for all the bearers of the subscriber has been established, the TPF will directly employ the Diameter session identifier in the TPF/CRF Diameter Session State Model formerly established for all the bearers of the subscriber to identify the relationship between the currently established bearer and the formerly established TPF/CRF Diameter session; otherwise, i.e. the currently established bear is the first bearer established by the subscriber in the TPF, the TPF will establish a TPF/CRF Diameter Session State Model for all the bearers of the subscriber, allocates a new TPF-part Diameter session identifier to the Diameter session, stores the corresponding information such as the TPF-part Diameter session identifier, the subscriber information, the bearer properties, the network information and so on, and provides the CRF with the allocated TPF-part Diameter session identifier. The TPF-part Diameter session identifier can be carried in the Request Charging Rules transmitted from the TPF to the CRF. On receiving the Request Charging Rules carrying the TPF-part Diameter session identifier, the CRF establishes a new TPF/CRF Diameter Session State Model, allocates a CRF-part Diameter session identifier, combines the CRF-part Diameter session identifier and the TPF-part Diameter session identifier provided by the TPF into an integrated Diameter session identifier, stores the corresponding information such as the integrated Diameter session identifier, the subscriber information, the bearer properties, the network information and so on, and provides the TPF with the integrated Diameter session identifier. The integrated Diameter session identifier can be carried in the message carrying the charging rules returned from the CRF to the TPF, i.e. the Response Charging Rules. On receiving the Response Charging Rules carrying the integrated Diameter session identifier, the TPF acquires the formerly established TPF/CRF Diameter Session State Model according to the TPF-part Diameter session identifier of the integrated Diameter session identifier and updates the stored information, e.g. updates the TPF-part Diameter session identifier to the integrated Diameter session identifier.

The step of the TPF or the CRF determining whether a TPF/CRF Diameter Session State Model has been established for all the bearers of the same subscriber can be realized by establishing a Bearer Activate/Deactivate State Model in the TPF or in the CRF. The TPF or the CRF establishes a Bearer Activate/Deactivate State Model on receiving the first Establish Bearer Service Request of the certain subscriber, and releases the Bearer Activate/Deactivate State Model on receiving the last Terminate Bearer Service Request of the subscriber. In this way, it can be determined whether the TPF/CRF Diameter Session State Model for all the bearers of the subscriber has been established through determining whether the Bearer Activate/Deactivate State Model for the subscriber exists.

After establishing the TPF/CRF Diameter session, the TPF and the CRF perform information interaction, for example, the CRF provides the TPF with the charging rule, and the TPF performs charging to the filtered IP Flow according to the charging rule provided by the CRF.

Figure 11:
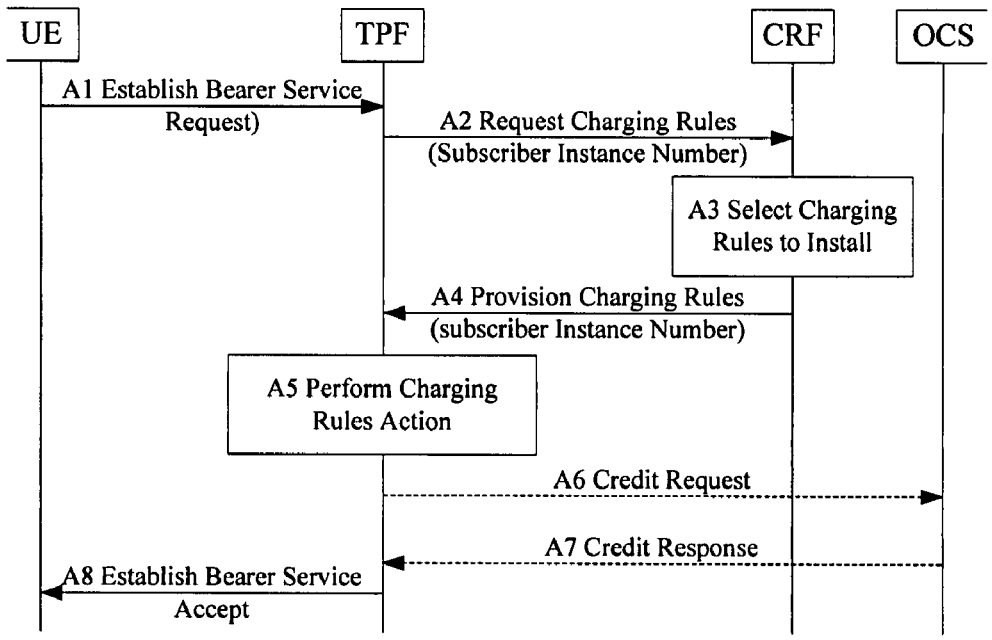
FIG. 11 is a schematic diagram illustrating a process of establishing a TPF/CRF Diameter session for all bearers of each subscriber, in which the Diameter session identifier is allocated by the TPF.

FIG. 11 is a schematic diagram illustrating a process of establishing a TPF/CRF Diameter session for all bearers of each subscriber, in which the Diameter session identifier is allocated by the TPF. As shown in FIG. 11, the Diameter session establishing process, in which the TPF/CRF Diameter session is established for all the bearers of each subscriber and the Diameter session identifier is allocated by the TPF, includes the following steps.

Step A1 is as same as step 301.

Step A2: on receiving the Establish Bearer Service Request, according to the subscriber identifier information, the TPF determines whether the TPF/CRF Diameter session for all the bearers of the subscriber has been established with the CRF. If the TPF/CRF Diameter session for all the bearers of the subscriber has been established, the TPF directly transmits to the CRF a Request Charging Rules carrying the input information for the CRF to determine the charging rules and the formerly allocated Diameter session identifier, which identifies the relationship between the Request Charging Rules in the current Diameter session and the formerly established TPF/CRF Diameter session; otherwise, the TPF establishes a TPF/CRF Diameter Session State Module, allocates a new Diameter session identifier and stores the corresponding information such as the Diameter session identifier, the subscriber information, the bearer properties, the network information and so on, then transmits to the CRF a Request Charging Rules carrying the input information for the CRF to determine the charging rule and the newly allocated Diameter session identifier.

Step A3 is as same as step 303.
Step A4 is as same as step 304.
Step A5 is as same as step 305.
Steps A6-A7 are as same as steps 306-307.
Step A8 is as same as step 308.

Figure 12:
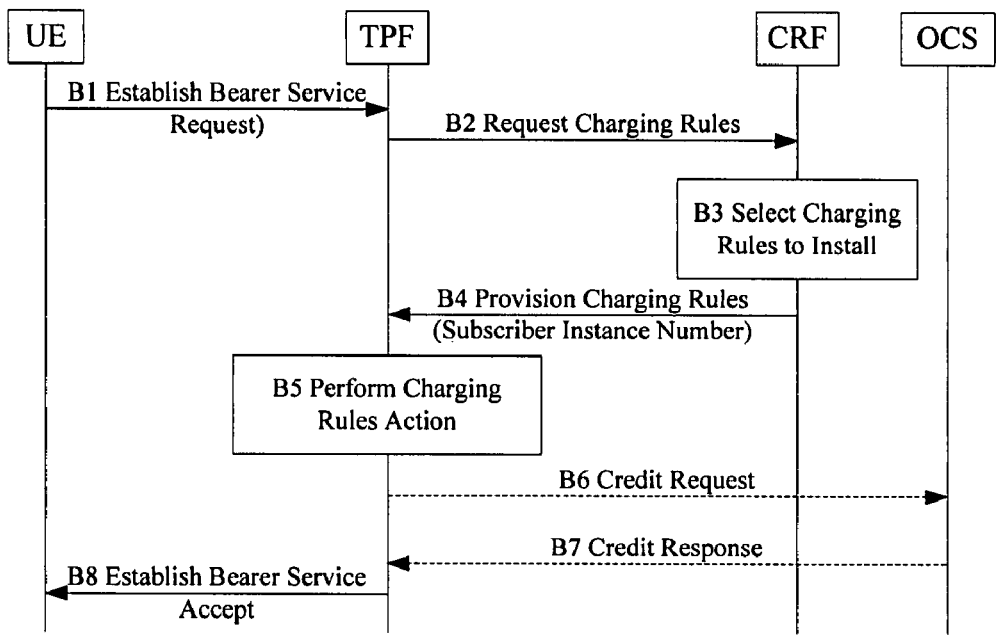
FIG. 12 is a schematic diagram illustrating a process of establishing a TPF/CRF Diameter session for all bearers of each subscriber, in which the Diameter session identifier is allocated by the CRF.

FIG. 12 is a schematic diagram illustrating a process of establishing a TPF/CRF Diameter session for all bearers of each subscriber, in which the Diameter session identifier is allocated by the CRF. As shown in FIG. 12, the Diameter session establishing process, in which the TPF/CRF Diameter session is established for all the bearers of each subscriber and the Diameter session identifier is allocated by the CRF, includes the following steps.

Step B1 is as same as step 401.

Step B2: on receiving the Establish Bearer Service Request, the TPF transmits to the CRF a Request Charging Rules carrying the input information for the CRF to determine the charging rules and a Bearer Establishing Indication used for identifying that the Request Charging Rules is initiated based on the bearer establishment, as well as subscriber identifier information and TPF address information.

Step B3: on receiving the Request Charging Rules, according to the Bearer Establishing Indication, the subscriber identifier information and the TPF address information carried in the Request Charging Rules, the CRF determines whether the TPF/CRF Diameter session for all the bearers of the subscriber has been established. If the TPF/CRF Diameter session for all the bearers of the subscriber has been established, the CRF directly returns to the TPF a Provision Charging Rules carrying the identified charging rule, the charging rule action indication and the formerly allocated Diameter session identifier, which identifies the relationship between the Provision Charging Rules in the current Diameter session and the formerly established TPF/CRF Diameter session; otherwise, the CRF establishes a TPF/CRF Diameter Session State Model, allocates a new Diameter session identifier to the current Diameter session and stores the corresponding information such as the Diameter session identifier, the subscriber information, the bearer properties, the network information and so on. Then the CRF selects a proper charging rule according to the input information carried in the Request Charging Rules, or according to the relevant input information provided by the AF. If the charging mechanism is online charging, the CRF can also select the proper charging rule according to the relevant input information provided by the OCS.

Step B4 is as same as step 404
Step B5 is as same as step 405.
Steps B6-B7 are as same as steps 406-407.
Step B8 is as same as step 408.

Figure 13:
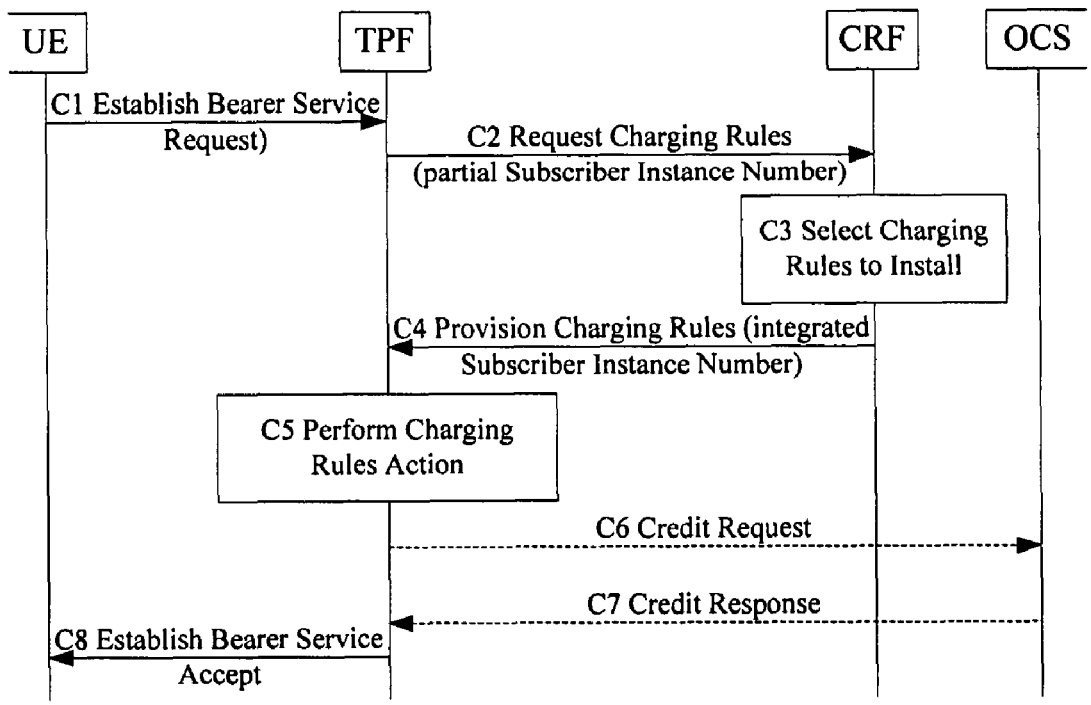
FIG. 13 is a schematic diagram illustrating a process of establishing a TPF/CRF Diameter session for all bearers of each subscriber, in which the Diameter session identifier is allocated by the TPF and the CRF.

FIG. 13 is a schematic diagram illustrating a process of establishing a TPF/CRF Diameter session for all bearers of each subscriber, in which the Diameter session identifier is jointly allocated by the TPF and the CRF. As shown in FIG. 13, the Diameter session establishing process, in which the TPF/CRF Diameter session is established for all the bearers of each subscriber and the Diameter session identifier is allocated by the TPF and the CRF, includes the following steps.

Step C1 is as same as step 501.

Step C2: on receiving the Request Charging Rules, according to the subscriber identifier information, the TPF determines whether the TPF/CRF Diameter session for all the bearers of the subscriber has been established. If the TPF/CRF Diameter session for all the bearers of the subscriber has been established, the TPF directly transmits to the CRF a Request Charging Rules carrying the input information for the CRF to determine the charging rule and the formerly allocated Diameter session identifier, which identifies the relationship between the Request Charging Rules in the current Diameter session and the formerly established TPF/CRF Diameter session; otherwise, the TPF establishes a TPF/CRF Diameter Session State Model, allocates a new TPF-part Diameter session identifier to the current Diameter session and stores the corresponding information such as the TPF-part Diameter session identifier, the subscriber information, the bearer properties, the network information and so on, then transmits to the CRF a Request Charging Rules, which carries the input information for the CRF to determine the charging rule and the currently allocated TPF-part Diameter session identifier.

Step C3 is as same as step 503.
Step C4 is as same as step 504.
Step C5 is as same as step 505.
Steps C6-C7 are as same as steps 506-507.
Step C8 is as same as step 508.

When establishing TPF/CRF Diameter sessions for all the bearers of each subscriber, the operations in each TPF/CRF Diameter session, e.g. providing, modifying or deleting the charging rules, or providing an Event Trigger etc., are irrelative to a single bearer of the subscriber, i.e. these operations are for all the bearers of the subscriber. The CRF can perform uniform FBC control to the bearers of the subscriber through the TPF/CRF Diameter Session State Model.

In addition, to enable the CRF to perform FBC control to each bearer of the subscriber, when each bearer is established, the TPF can be demanded to allocate a corresponding Bearer ID to the bearer. The Bearer ID is transmitted to the CRF when the TPF requests the charging rule from the CRF for the first time, or when the TPF reports the Event Trigger to the CRF for the first time. It needs to be guaranteed that the Bearer ID allocated by the TPF is unique for the bearers of the subscriber, i.e. the Bearer ID for one bearer of the subscriber is not same as the Bearer ID of any other bearers of the subscriber. The CRF can perform different FBC control to different bearers of the same subscriber according to the TPF/CRF Diameter Session State Model and the Bearer ID.

Figure 14:
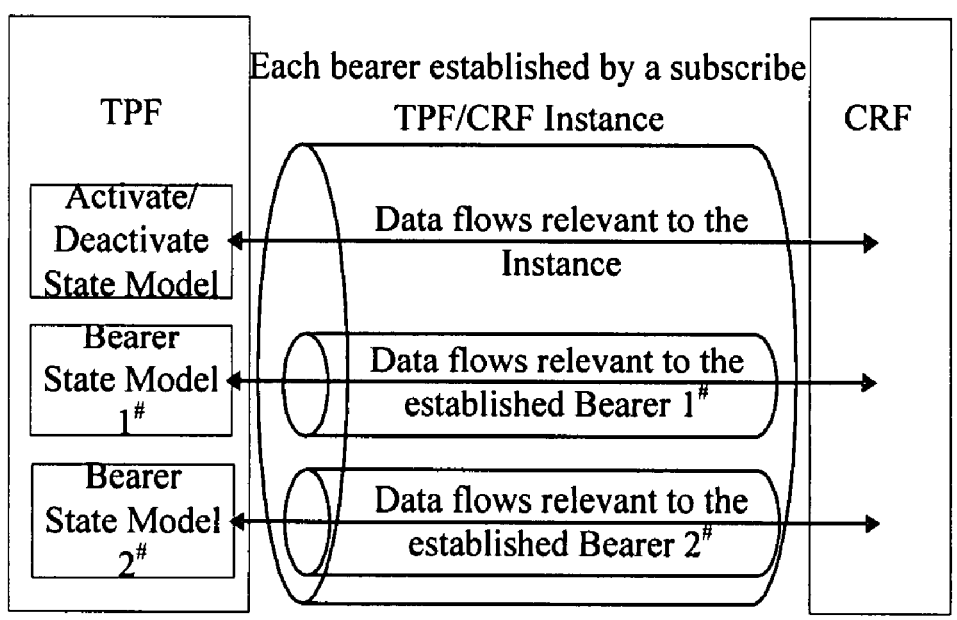
FIG. 14 is a schematic diagram illustrating a process of establishing a TPF/CRF Diameter session for all bearers of each subscriber.

FIG. 14 is a schematic diagram illustrating a process of establishing a TPF/CRF Diameter session for all bearers of each subscriber. As shown in FIG. 14, for the same subscriber in the TPF, each TPF/CRF Diameter Session State Model always includes at least one Bearer Activate/Deactivate State Model; moreover, one TPF/CRF Diameter Session State Model can further include multiple Bearer Establishing State Models relevant to the Bearer Activate/Deactivate State Model. In other words, for GPRS, one TPF/CRF Diameter Session State Model is composed of at least one GPRS Activate/Deactivate State Model and optional multiple GPRS PDP Context State Models.

To sum up, the foregoing is only preferred embodiments of the present invention and is not to be used for limiting the protection scope thereof. Any changes, modifications and improvements can be made by those skilled in the art without departing from the spirit and principle of the invention and therefore should be covered and protected by the scope of the invention as set by the appended claims and its equivalents.

I claim:

1. A method for establishing a Diameter session for packet flow based charging, comprising:

using a processor, establishing, for each bearer of each subscriber, a Diameter session between a Traffic Plane Function (TPF) and a Charging Rule Function (CRF); and providing, modifying or deleting charging rules based on the established Diameter session for each bearer of each subscriber, or providing an Event Trigger based on the established Diameter session for each bearer of each subscriber, wherein the step of establishing the Diameter session comprises:

when the bearer is established, the TPF establishing a TPF/CRF Diameter Session State Model, allocating a TPF-part Diameter session identifier to the Diameter session and providing the CRF with the TPF-part Diameter session identifier; and the CRF establishing its TPF/CRF Diameter Session State Model, allocating a CRF-part Diameter session identifier to the Diameter session and combining the TPF-part Diameter session identifier and the CRF-part Diameter session identifier to form an integrated Diameter session identifier of the TPF/CRF Diameter session, the method further comprising:

the CRF providing the TPF with the integrated Diameter session identifier; and the TPF acquiring its established TPF/CRF Diameter Session State Model according to the TPF-part Diameter session identifier of the integrated Diameter session identifier, and updating the TPF-part Diameter session identifier to the integrated Diameter session identifier.

2. The method of claim 1, wherein the TPF-part Diameter session identifier is provided from the TPF to the CRF by means of being carried in a charging rule request sent by the TPF to the CRF.

3. The method of claim 2, wherein the charging rule request further comprises input information that is used for the CRF determining the charging rules.

4. The method of claim 1, wherein the integrated Diameter session identifier is provided from the CRF to the TPF by being carried in a response message including the charging rules returned by the CRF to the TPF.

5. The method of claim 1, wherein the TPF is a Gateway GPRS Support Node (GGSN) in GPRS.

6. A method for establishing a Diameter session for packet flow based charging, comprising:

using a processor, establishing, for bearers with a same access point name (APN) of each subscriber, a Diameter session between a Traffic Plane Function (TPF) and a Charging Rule Function (CRF), the Diameter session being identified by a Diameter session identifier; and the TPF intercommunicating with the CRF based on the established Diameter session, the method further comprising:

before establishing the Diameter session, the TPF confirming, according to subscriber identifier information and APN information, that no Diameter session for the APN of the subscriber has been established between the TPF and the CRF, wherein the step of establishing the Diameter session comprises:

the TPF establishing a TPF/CRF Diameter Session State Model, allocating a TPF-part Diameter session identifier to the Diameter session and providing the CRF with the TPF-part Diameter session identifier; and the CRF establishing a TPF/CRF Diameter Session State Model, allocating a CRF-part Diameter session identifier to the Diameter session and combining the TPF-part Diameter session identifier and the CRF-part Diameter session identifier to form an integrated Diameter session identifier as the Diameter session identifier of the TPF/CRF Diameter session; and after the step of establishing the Diameter session, the method further comprising:

the CRF providing the TPF with the integrated Diameter session identifier; and the TPF acquires the established TPF/CRF Diameter Session State Model according to the TPF-part Diameter session identifier of the integrated Diameter session identifier, and updating the TPF-part Diameter session identifier to the integrated Diameter session identifier.

7. The method according to claim 6, wherein the step of establishing the Diameter session comprises:

the TPF establishing a TPF/CRF Diameter Session State Model, allocating the Diameter session identifier to the Diameter session and providing the CRF with the Diameter session identifier; and the CRF establishing a TPF/CRF Diameter Session State Model according to the received Diameter session identifier received from the CRF.

8. The method according to claim 6, further comprising before establishing the Diameter session, on receiving a Bearer Establishing Indication from the TPF, the CRF confirming, according to TPF address information, subscriber identifier information and APN information, that no Diameter session for the APN of the subscriber has been established between the TPF and the CRF.

9. The method according to claim 8, wherein the step of establishing the Diameter session comprises:

the CRF establishing a TPF/CRF Diameter Session State Model, allocating the Diameter session identifier to the Diameter session and providing the TPF with the Diameter session identifier; and the TPF establishing a TPF/CRF Diameter Session State Model according to the received Diameter session identifier received from the CRF.

10. The method according to claim 8, wherein the Bearer Establishing Indication, the TPF address information, the subscriber identifier information and the APN information are provided by the TPF.

11. The method according to claim 6, further comprising:

the TPF allocating a Bearer ID to each established bearer, and providing the Bearer ID to the CRF.

12. The method of claim 6, wherein content of the intercommunication between the TPF and CRF comprises at least one of charging rule and event trigger, the event trigger being used to trigger the TPF entity request the charging rule from the CRF entity.

13. A method in a communication system, the method comprising:

establishing, for each bearer of a subscriber, a Diameter session between a traffic plane function (TPF) entity in a flow based charging communication system and a charging rule function (CRF) entity in the flow based charging communication system, the Diameter session being identified by a session identifier; and intercommunicating between the traffic plane function entity and the charging rule function entity based on the established Diameter session, wherein content of the intercommunication comprises at least one of a group of charging rule, event trigger and combination thereof, the event trigger being used to trigger the TPF entity request charging rule from the CRF entity;

the method further comprising sending, by the traffic plane function entity, the session identifier to the charging rule function entity, wherein the step of sending the session identifier comprises sending, by the TPF entity, a charging rule request to the CRF entity for request charging rule from the CRF, the session identifier being carried in the charging rule request.

14. The method of claim 13, wherein the charging rule request further comprises input information used for the CRF determining the charging rule.

15. The method of claim 13, further comprising sending by the CRF entity the session identifier to the TPF entity.

16. The method of claim 13, wherein the step of establishing the Diameter session comprises establishing a TPF/CRF diameter session state model corresponding to the bearer of the subscriber in the TPF entity and the CRF entity respectively.

17. The method of claim 13, wherein the session identity is allocated by the TPF entity, or allocated by the CRF entity or co-allocated by the TPF entity and the CRF entity.

18. The method of claim 13, wherein the TPF entity is Gateway GPRS Support Node (GGSN) in GPRS.

* * * * *

UNITED STATES PATENT AND TRADEMARK OFFICE
CERTIFICATE OF CORRECTION

| | | |
|---|---|---|
| PATENT NO. | : 7,889,650 B2 | Page 1 of 1 |
| APPLICATION NO. | : 11/702520 | |
| DATED | : February 15, 2011 | |
| INVENTOR(S) | : Duan | |

It is certified that error appears in the above-identified patent and that said Letters Patent is hereby corrected as shown below:

In Col. 21, line 48, claim 7, delete "received".
In Col. 22, line 6, claim 9, delete "received".

Signed and Sealed this
Nineteenth Day of April, 2011

David J. Kappos
*Director of the United States Patent and Trademark Office*